United States Patent
Ranjan

(10) Patent No.: US 11,861,095 B2
(45) Date of Patent: Jan. 2, 2024

(54) TOUCHSCREEN LOCK FEATURE FOR PLAYBACK OF MEDIA CONTENT

(71) Applicant: SLING MEDIA PVT LTD, Bangaluru (IN)

(72) Inventor: Rashmi Ranjan, Marathahalli (IN)

(73) Assignee: DISH Network Technologies India Private Limited

( * ) Notice: Subject to any disclaimer, the term of this patent is extended or adjusted under 35 U.S.C. 154(b) by 0 days.

(21) Appl. No.: 17/451,549

(22) Filed: Oct. 20, 2021

(65) Prior Publication Data
US 2023/0120950 A1    Apr. 20, 2023

(51) Int. Cl.
*G06F 3/041* (2006.01)
*G06F 3/04842* (2022.01)
*G06F 3/04886* (2022.01)
*G06V 40/12* (2022.01)

(52) U.S. Cl.
CPC ........ *G06F 3/0416* (2013.01); *G06F 3/04842* (2013.01); *G06F 3/04886* (2013.01); *G06V 40/12* (2022.01)

(58) Field of Classification Search
CPC ............... G06F 3/0416; G06F 3/04842; G06F 3/04886; G06V 40/12
See application file for complete search history.

(56) References Cited

U.S. PATENT DOCUMENTS

| | | | | |
|---|---|---|---|---|
| 10,165,108 | B1* | 12/2018 | Douglas | G06Q 30/0262 |
| 2008/0249643 | A1* | 10/2008 | Nelson | G07C 9/30 700/94 |
| 2009/0323260 | A1* | 12/2009 | Son | G11B 33/025 361/679.01 |
| 2010/0001967 | A1* | 1/2010 | Yoo | G06F 3/04817 715/833 |
| 2016/0253538 | A1* | 9/2016 | Lu | G06V 40/1306 382/124 |
| 2017/0153743 | A1* | 6/2017 | Kim | G06F 3/0421 |
| 2017/0239525 | A1* | 8/2017 | Kim | A63B 71/0622 |
| 2020/0142548 | A1* | 5/2020 | Karunamuni | G06F 3/04883 |
| 2021/0056280 | A1* | 2/2021 | Cheng | G06V 40/67 |

* cited by examiner

Primary Examiner — Ryan A Lubit
(74) Attorney, Agent, or Firm — KW Law, LLP

(57) ABSTRACT

An electronic device and related operating methodology are disclosed here. The device includes a touchscreen display, at least one memory storage device, and at least one processor. The at least one storage device has instructions stored therein and configurable to be executed by the at least one processor to: control display of a media player on the touchscreen display; control display of an interactive lock element on the touchscreen display; detect occurrence of an activate lock trigger event; and, in response to detecting the occurrence of the activate lock trigger event, lock or disable at least some touchscreen functionality of the media player during playback of media content.

14 Claims, 6 Drawing Sheets

TOUCHSCREEN LOCK FEATURE FOR PLAYBACK OF MEDIA CONTENT

TECHNICAL FIELD

Embodiments of the subject matter described herein relate generally to features and functions associated with client device applications, such as media player applications. More particularly, embodiments of the subject matter relate to the locking or disabling of touchscreen functionality during playback of media content by a media player application.

BACKGROUND

The prior art includes various media playback devices and media player applications designed to play digital media content (e.g., audio, video, or images). Client devices (such as mobile phones, portable computer devices, desktop computer devices, gaming devices, and medical devices) may include media player applications that can play streaming media content, locally stored or recorded media files, and/or media content stored on a tangible memory element such as flash memory, an optical disc, or the like. The presentation of video or audio content can also be supported by vehicle instrumentation panels, tools, system control panels, and the like.

Touchscreen displays are commonly used for mobile devices, tablet computer devices, laptop computer devices, desktop computer devices, vehicle instrument panels, medical equipment, remote control devices, navigation systems, and the like. Accordingly, conventional media player applications rendered on a touchscreen display can be controlled using finger touches, gestures, a stylus, or the like. In this regard, touchscreen interfaces can be very convenient. On the other hand, a touchscreen can also be the source of distractions if accidentally touched during playback of media content. For example, playback of media content can be inadvertently stopped, paused, or otherwise interrupted if the touchscreen is accidentally touched.

For various reasons, it is desirable to have a user-controllable feature that locks, disables, or otherwise modifies the touch sensitivity of a touchscreen display of an electronic device during playback of media content. A number of touchscreen features, along with other desirable functions and characteristics related to applications suitable for a device having a touchscreen display, will become apparent from the subsequent detailed description and the appended claims, taken in conjunction with the accompanying drawings and this background section.

BRIEF SUMMARY

Disclosed here is a method of controlling touch sensitivity of a touchscreen display of an electronic device during playback of media content. Exemplary embodiments of the method involve the steps of: controlling display of a media player on the touchscreen display; controlling display of an interactive lock element on the touchscreen display; detecting occurrence of an activate lock trigger event; and in response to detecting the occurrence of the activate lock trigger event, locking or disabling at least some touchscreen functionality of the media player during playback of media content.

Also disclosed is an electronic device. Exemplary embodiments of the device include: a touchscreen display; at least one memory storage device; and at least one processor communicatively coupled to the at least one memory storage device and to the touchscreen display. The at least one memory storage device has computer executable instructions stored therein and configurable to be executed by the at least one processor to perform a method that involves the following steps: controlling display of a media player on the touchscreen display; controlling display of an interactive lock element on the touchscreen display; detecting occurrence of an activate lock trigger event; and in response to detecting the occurrence of the activate lock trigger event, locking or disabling at least some touchscreen functionality of the media player during playback of media content.

Also disclosed is a non-transitory machine-readable storage medium having executable instructions stored thereon, the instructions configurable to cause at least one processor to perform at least the following operations: controlling display of a media player on the touchscreen display; controlling display of an interactive lock element on the touchscreen display; detecting occurrence of an activate lock trigger event; and in response to detecting the occurrence of the activate lock trigger event, locking or disabling at least some touchscreen functionality of the media player during playback of media content.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
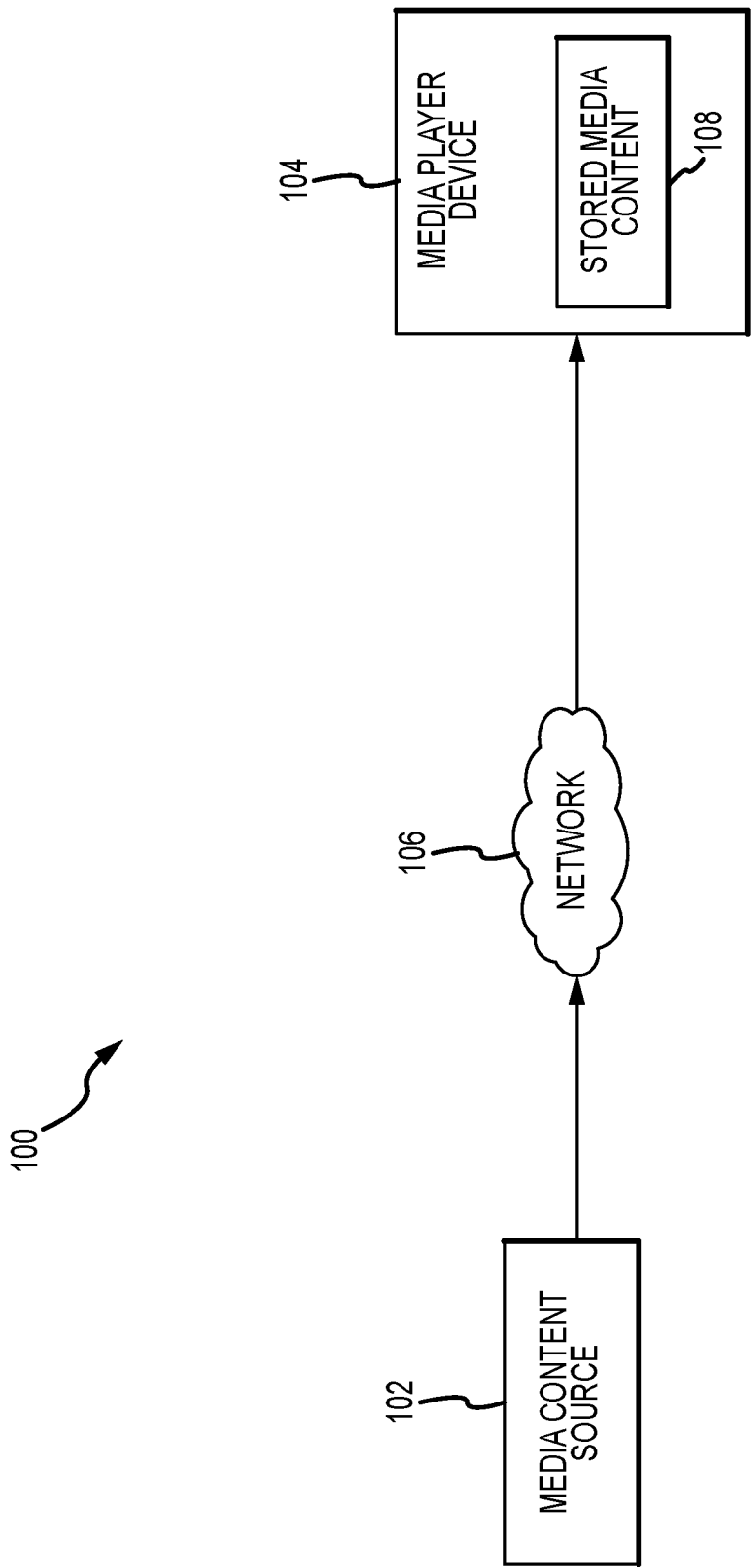
FIG. 1 is a simplified block diagram representation of an exemplary embodiment of a digital media delivery and presentation system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, or the like, various elements of the systems and devices described herein are essentially the code segments or instructions that cause one or more processor devices to perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

The subject matter presented here relates to certain features of a media player application that can be rendered on a touchscreen display of an electronic device. More specifically, the disclosed subject matter relates to a touchscreen locking feature that disables at least some touchscreen functionality of a media player during playback of media content. The media player described herein can support the playback of audio content, video-only content, video content that includes audio (i.e., traditional video content), a slideshow of still images, or the like. For ease of description and simplicity, the following description refers to the presentation of video content in the context of an exemplary video player embodiment.

A media player of the type described herein can be rendered and displayed on any suitably configured touchscreen display. The touchscreen display can be integrated with a host electronic device, or it can be a distinct component that communicates and cooperates with an electronic device. In certain embodiments, a touchscreen display can be realized as a removable peripheral component that is compatible with a host electronic device. In yet other embodiments, the touchscreen display can be implemented with a more complex system, tool, or instrument (such as a vehicle, a piece of manufacturing equipment, an appliance, or the like). In this regard, an electronic device having a touchscreen display can be realized as any of the following devices, systems, or components, without limitation: a mobile telephone; a personal computer (in any form factor, including a desktop, a laptop, a handheld, etc.); a tablet computing device; a wearable computing device; a video game device or console; a digital media player device; a household appliance; a piece of home entertainment equipment; a medical device; a navigation device; an electronic toy or game; a vehicle instrument or instrument panel; a control panel of a piece of machinery, a tool, or the like; a digital camera or video camera; a musical instrument; or a remote control device. It should be appreciated that this list is not exhaustive, and it is not intended to limit the scope or application of the embodiments described herein.

Turning now to the drawings, FIG. 1 is a simplified block diagram representation of an exemplary embodiment of a video delivery system 100 that is suitably configured to support the techniques and methodologies described in more detail below. The system 100 (which has been simplified for purposes of illustration) generally includes, without limitation: at least one media content source 102 (referred to in the singular form herein for the sake of convenience); and an electronic device (e.g., a media player device 104 or other form of customer equipment that is capable of receiving, processing, and rendering media content). In certain embodiments, the media player device 104 communicates with the media content source 102 using a data communication network 106. For the sake of brevity, conventional techniques related to satellite, cable, and Internet-based communication systems, video broadcasting systems, data transmission, signaling, network control, and other functional aspects of the systems (and the individual operating components of the systems) may not be described in detail herein.

The data communication network 106 is any digital or other communications network capable of transmitting messages between senders (e.g., the media content source 102) and receivers (e.g., the media player device 104). In various embodiments, the network 106 includes any number of public or private data connections, links or networks supporting any number of communications protocols. The network 106 may include the Internet, for example, or any other network based upon TCP/IP or other conventional protocols. In various embodiments, the network 106 also incorporates a wireless and/or wired telephone network, such as a cellular communications network for communicating with mobile phones, personal digital assistants, and/or the like. The network 106 may also incorporate any sort of wireless or wired local area networks, such as one or more IEEE 802.3 and/or IEEE 802.11 networks.

The media content source 102 may be deployed as a head end facility and/or a satellite uplink facility for the system 100. In some embodiments, the media content source 102 may include or cooperate with one or more web-based content delivery applications, services, or providers. The media content source 102 generally functions to control content, signaling data, programming information, and other data sent to any number of receiving components. The media content source 102 includes one or more data processing systems or architectures that are capable of producing signals that are transmitted to customer premise equipment, mobile devices, computer systems, or the like. In various embodiments, the media content source 102 represents a satellite, cable, cloud-based, or other content distribution center having suitably configured and deployed control system(s) for obtaining, accessing, managing, and/or communicating content, signaling information, blackout information, programming information, and other data.

The media player device 104 may be implemented as a computer-based or processor-based electronic device having an appropriate media player application installed thereon. The media player application supports the playback of streaming media content, which can be provided by the media content source 102. Alternatively or additionally, the media player application supports the playback of stored media content 108, which can be locally stored at the media player device 104.

Figure 2:
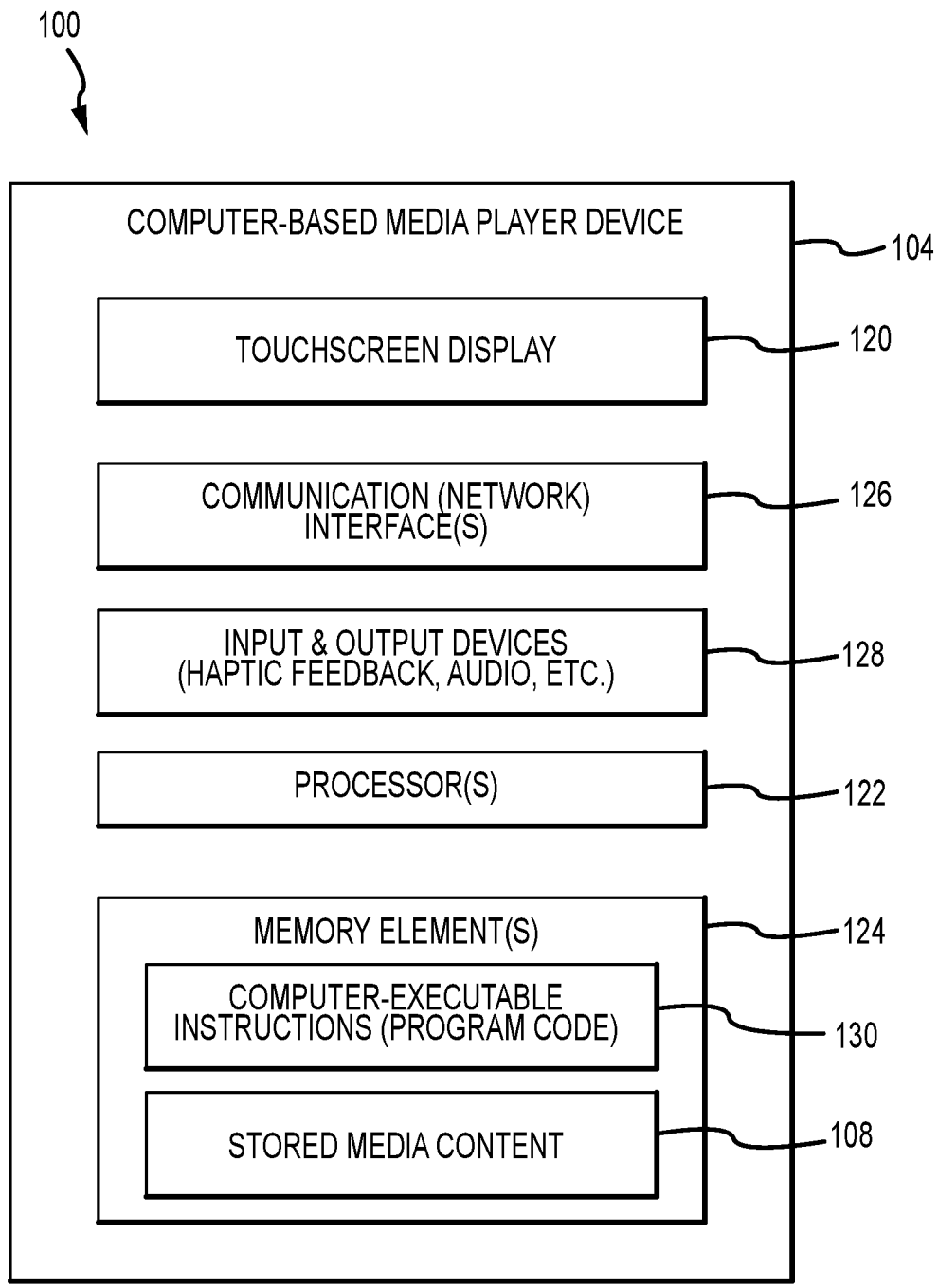
FIG. 2 is a simplified block diagram representation of an exemplary embodiment of a computer-based media player device having a touchscreen display.

FIG. 2 is a simplified block diagram representation of an exemplary embodiment of a computer-based media player device 104 having a touchscreen display 120 that supports the presentation of media content. The device 104 generally includes, without limitation: at least one processor 122; at least one memory storage device or element 124; the touchscreen display 120; at least one communication (network) interface 126; and input and output (I/O) devices 128. In practice, the device 104 can include additional components, elements, and functionality that may be conventional in nature or unrelated to the particular media playback functionality described here.

A processor 122 may be, for example, a central processing unit (CPU), a field programmable gate array (FPGA), a microcontroller, an application specific integrated circuit (ASIC), or any other logic device or combination thereof. One or more memory elements 124 are communicatively coupled to the at least one processor 122, and can be implemented with any combination of volatile and nonvolatile memory. The memory element 124 has non-transitory machine-readable and computer-executable instructions (program code) 130 stored thereon, wherein the instructions 130 are configurable to be executed by the at least one processor 122 as needed. When executed by the at least one processor 122, the instructions 130 cause the at least one processor 122 to perform the associated tasks, processes, and operations defined by the instructions 130. Of course, the memory element 124 may also include instructions associated with a file system of the host device 104 and instructions associated with other applications or programs. Moreover, the memory element 124 can serve as a data storage unit for the host device 104. For example, the memory element 124 can provide a storage buffer for images (e.g., video frame thumbnails, selected screenshots, or the like) and/or for streaming media content that is presented by the device 104. In certain embodiments, the memory element 124 is used to maintain stored media content 108 that can be presented by the device 104.

The touchscreen display 120 may be integrated with the device 104 or communicatively coupled to the device 104 as a peripheral or accessory component. The shape, size, resolution, and technology of the touchscreen display 120 will be appropriate to the particular implementation of the device 104. The touchscreen display 120 can be realized as a monitor, screen, or another conventional electronic display that is capable of graphically presenting data and/or information provided by the device 104. The touchscreen display 120 is communicatively coupled to the at least one processor 122, and it can leverage existing technology to detect touch gestures and contact with a user's finger (or fingers), a stylus, or the like.

The communication interface 126 represents the hardware, software, and processing logic that enables the device 104 to support data communication with other devices. In practice, the communication interface 126 can be suitably configured to support wireless and/or wired data communication protocols as appropriate to the particular embodiment. For example, if the device 104 is a smartphone, then the communication interface 126 can be designed to support a cellular communication protocol, a short-range wireless protocol (such as the BLUETOOTH communication protocol), and a WLAN protocol. As another example, if the device 104 is a desktop or laptop computer, then the communication interface can be designed to support the BLUETOOTH communication protocol, a WLAN protocol, and a LAN communication protocol (e.g., Ethernet). In practice, the communication interface 126 enables the device 104 to receive media content for presentation on the touchscreen display 120, wherein the media content can be downloaded, streamed, or otherwise provided for real-time (or near real-time) playback or for storage at the device 104.

The I/O devices 128 enable the user of the device 104 to interact with the device 104 as needed. In practice, the I/O devices 128 may include, without limitation: a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; or any conventional peripheral device. In this context, the touchscreen display 120 can be categorized as an I/O device 128. Moreover, the touchscreen display 120 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

This description assumes that an electronic device of the type described above can be operated to present media content to a user. The source, format, and resolution of the media content are unimportant for purposes of this description. Indeed, the data that conveys the media content can be locally stored at the electronic device, or it can be provided in an on-demand streaming media format from a content source, a service provider, a cloud-based entity, or the like. The following description assumes that the device 104 and its installed media player application can successfully and compatibly process, render, and display the desired media (video) content in an appropriate manner.

Figure 3:
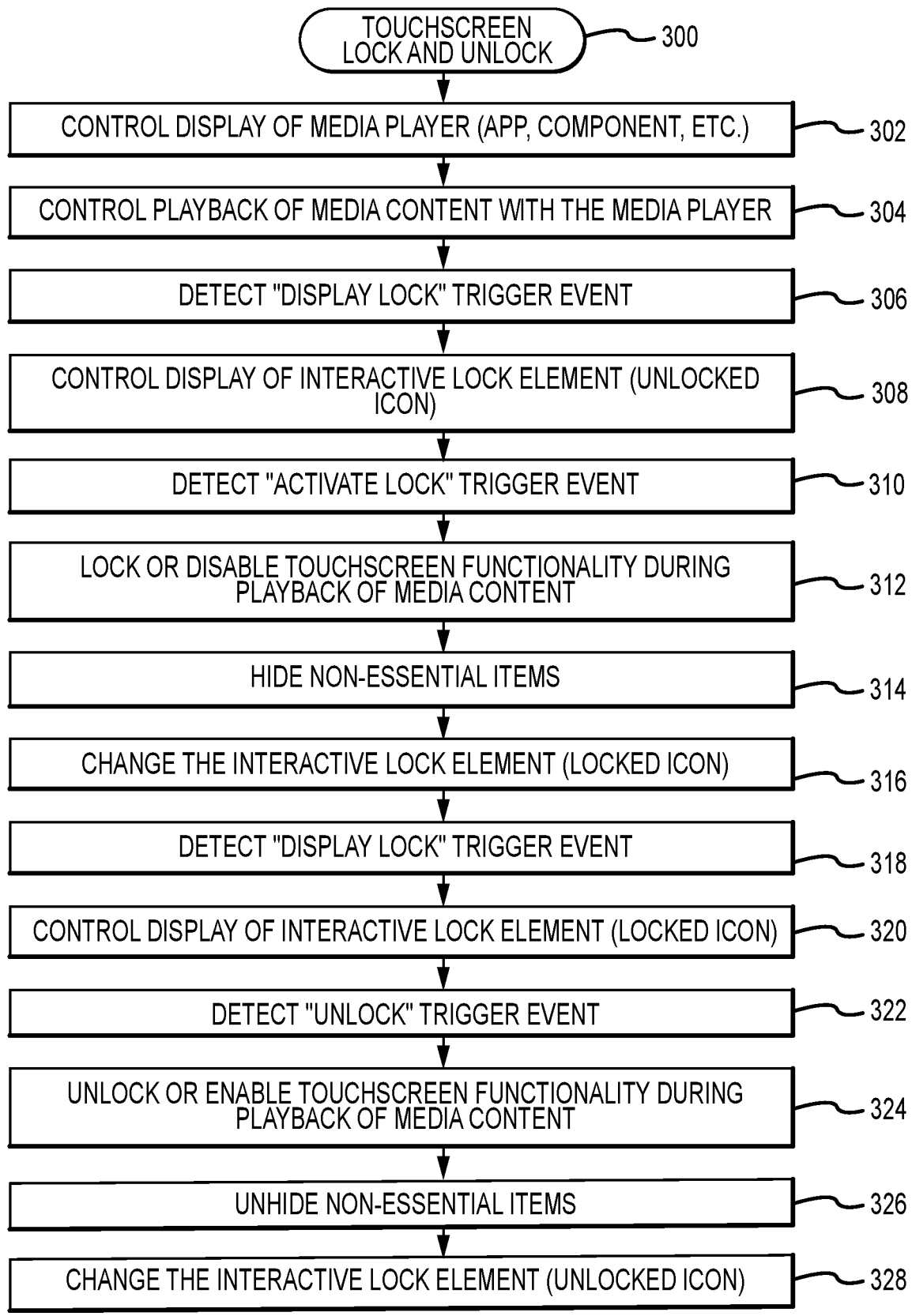
FIG. 3 is a flow chart that illustrates an exemplary embodiment of a process for controlling the touch sensitivity of a touchscreen display of an electronic device during playback of media content.

FIG. 3 is a flow chart that illustrates an exemplary embodiment of a process 300 for controlling the touch sensitivity of a touchscreen display of an electronic device during playback of media content. In accordance with the embodiment described here, the process 300 temporarily disables or locks at least some of the touchscreen functionality of a displayed media player during playback of media content, to reduce or eliminate playback interruptions caused by accidental contact with the touchscreen. The various tasks performed in connection with the process 300 may be performed by software, hardware, firmware, or any combination thereof. For illustrative purposes, the following description of the process 300 may refer to elements mentioned above in connection with FIG. 1 and FIG. 2. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

Figure 4:
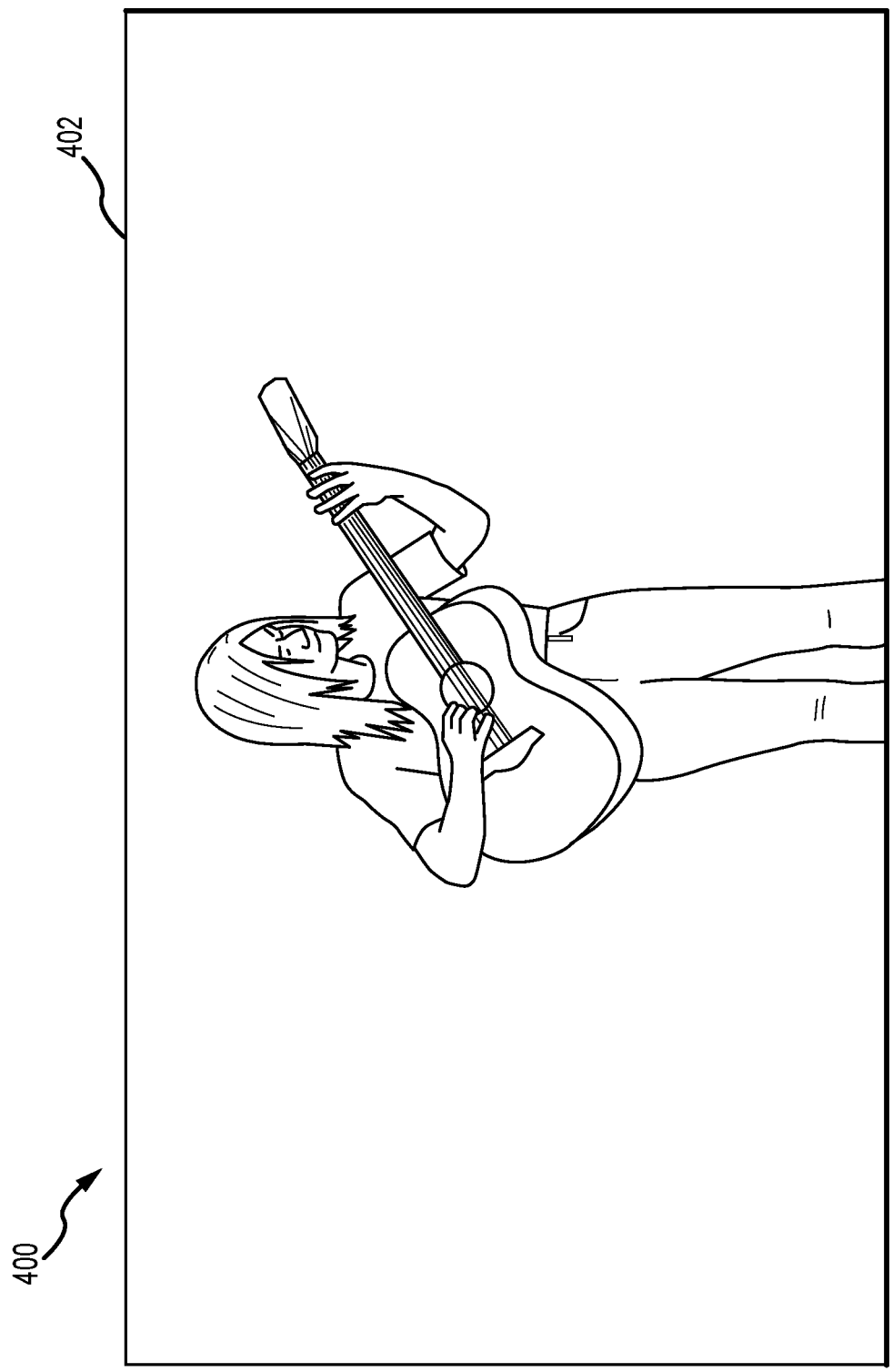
FIG. 4 is a screen shot of an exemplary media player, as captured during playback of video content.

The process 300 begins by controlling the display of a media player on the touchscreen display of an electronic device (task 302). Task 302 may involve the launching or opening of a media player application, a media player software component, or the like. This description assumes that the process 300 controls the playback of media content with the media player (task 304). In the case of video content, task 304 involves the display or presentation of the video content on the touchscreen display. For example, task 302 may be performed to open the media player with selected media content ready to be played, such that playback of the selected media content (task 304) begins when the user presses a graphical representation of a Play button. As another example, task 302 may be performed to open the media player and initiate automatic playback of the selected media content (task 304). In this regard, FIG. 4 is a screen shot of an exemplary media player 400, as captured during playback of video content. The illustrated embodiment of the media player 400 includes a primary window 402 for the presentation of media content. The primary window 402 in FIG. 4 can be defined by the entire rectangular perimeter (e.g., full-screen mode). FIG. 4 depicts a state where only the intended video content is displayed, and where common user interface elements, operating system elements, and media player controls are hidden, obscured, disabled, or deactivated. In accordance with certain embodiments, hidden, obscured, disabled, or deactivated items or elements can be momentarily displayed in the primary window 402 in response to detected user interaction (touch or contact) with the touchscreen display. For example, the media player controls, a playback progress bar, status indicators, and/or other elements can be displayed in an active manner for a few seconds when the user touches the touchscreen (anywhere on the screen or in designated areas or zones of the screen).

This example assumes that some type of detectable event, user interaction, command, or state/status of the host device triggers the display of an interactive lock element on the touchscreen display. Accordingly, the process 300 detects the occurrence of a "display lock" trigger event (task 306) and, in response to that trigger event, controls the display of the interactive lock element (task 308). In certain embodiments, the "display lock" trigger event corresponds to some type of user interaction with the host device, including, without limitation: physical contact with the touchscreen display (a simple touch, a designated tapping pattern, a designated swipe pattern, etc.); a voice command; movement of the host device (such as a designated type of shaking or motion); a detectable facial appearance; a detectable eye blinking pattern; and/or a biometric scan (such as a fingerprint scan, a retina or iris scan, a palm print or palm vein scan, etc.). In accordance with the exemplary embodiment described here, the "display lock" trigger event corresponds to interaction with the touchscreen display. Thus, if the user touches or taps anywhere on the touchscreen display (using a finger, a stylus, or any object that can serve as a touchscreen input device), the process 300 will respond by initiating the display of the interactive lock element (task 308).

Figure 5:
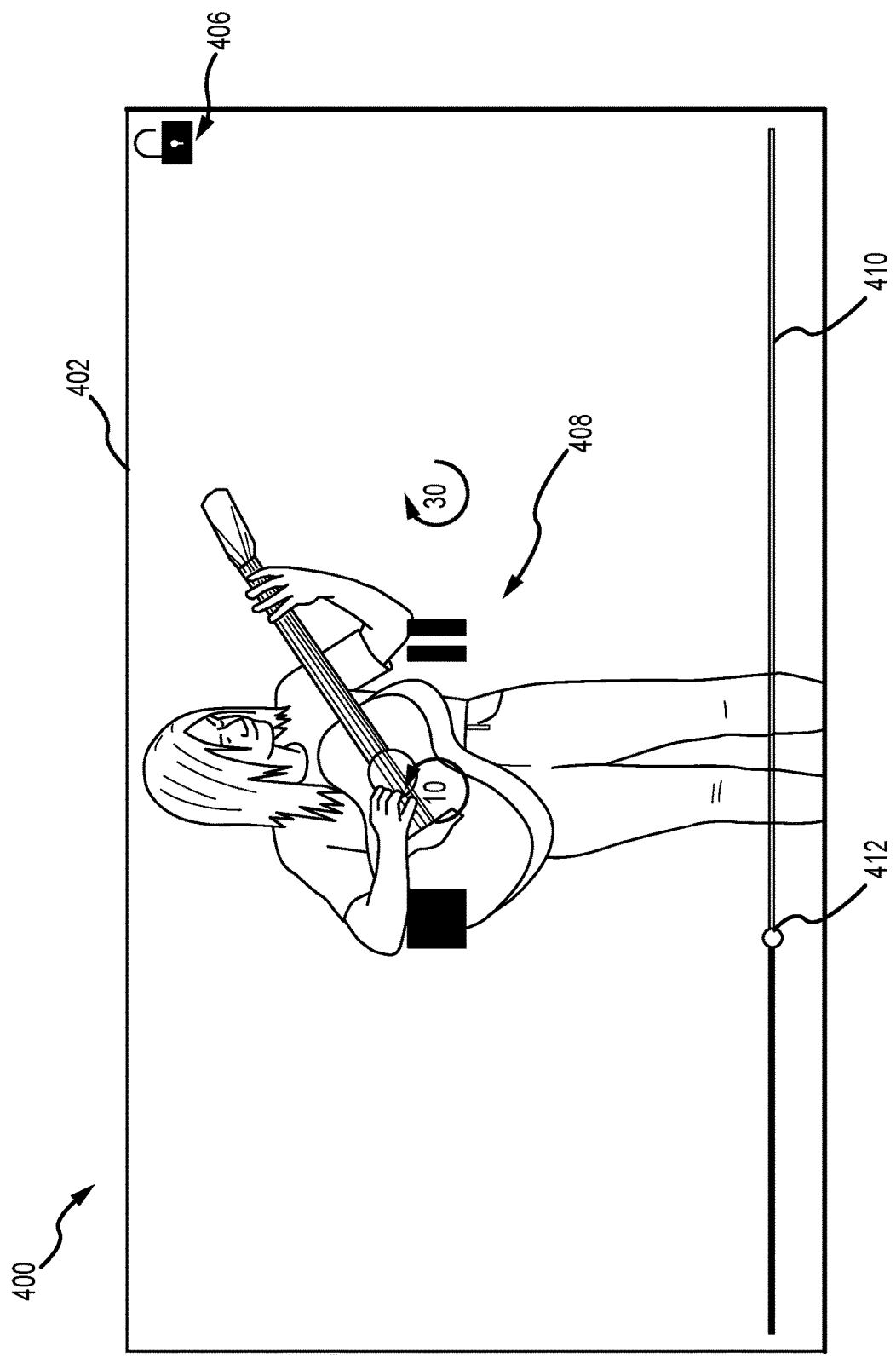
FIG. 5 is a screen shot of the media player shown in FIG. 4, as captured with an interactive lock element displayed in an unlocked state.

FIG. 5 is a screen shot of the media player 400 shown in FIG. 4, as captured with an interactive lock element 406 displayed in an unlocked state. FIG. 5 shows the state of the media player 400 after detection of a "display lock" trigger event and after the interactive lock element 406 has been rendered. In certain embodiments, processing of the "display lock" trigger event also causes the display of additional elements, such as user interface elements, media player controls, operating system buttons, or the like. In this regard, FIG. 5 depicts the media player 400 with the following displayed elements: media player controls 408 (e.g., Stop button, Back 10 Seconds button, Pause button, and Forward 30 Seconds button); a progress bar 410; and a play head 412 associated with the progress bar. It should be appreciated that additional information and/or graphical elements can be displayed in response to detection of the "display lock" trigger event.

The interactive lock element 406 is a graphical user interface (GUI) element that serves as a user control item. For the state depicted in FIG. 5, the interactive lock element 406 is displayed with an unlocked appearance to indicate that the touchscreen display is currently unlocked, enabled, and active (i.e., the touchscreen remains unmodified with its normal intended functionality). When the touchscreen display is locked, disabled, or inactive, the interactive lock element 406 is displayed with a locked appearance (see FIG. 6).

In certain embodiments, the interactive lock element 406, the media player controls 408, the progress bar 410, and the play head 412 are only temporarily displayed while the media content continues to play. For example, these items may automatically disappear after being displayed for a few seconds, 5 seconds, 10 seconds, or the like, unless one or more of the items are manipulated or touched. Accordingly, these items can appear when the touchscreen display is touched to enable the user to interact with one or more of them. However, if the user does not interact with any of these items, then they are removed from the display and the media content continues to play. After these items are removed, the media player 400 reverts to the full screen display mode (see FIG. 4).

This example assumes that some type of detectable event, user interaction, command, or state/status of the host device triggers the activation of the interactive lock element 406. Accordingly, the process 300 detects the occurrence of an "activate lock" trigger event (task 310) and, in response to detecting the occurrence of that trigger event, locks or disables at least some touchscreen functionality of the media player during playback of media content (task 312). In certain embodiments, the "activate lock" trigger event corresponds to some type of user interaction with the host device, including, without limitation: selecting the interactive lock element 406; physical contact with the touchscreen display (a simple touch, a designated tapping pattern, a designated swipe pattern, touching a designated area or zone of the touchscreen display, etc.); a voice command; movement of the host device (such as a designated type of shaking or motion); a detectable facial appearance; a detectable eye blinking pattern; and/or a biometric scan (such as a fingerprint scan, a retina or iris scan, a palm print or palm vein scan, etc.). In accordance with certain embodiments, the "activate lock" trigger event corresponds to interaction with the interactive lock element 406. Thus, if the user touches or taps on or near the displayed interactive lock element 406 (using a finger, a stylus, or any object that can serve as a touchscreen input device), the process 300 will respond by locking, disabling, or deactivating at least some of the touchscreen functionality (task 312).

In accordance with the exemplary embodiment described here, the user engages the interactive lock element 406 to change the functionality of the touchscreen display (locked/disabled versus unlocked/enabled). Thus, task 310 can be associated with the detection of a touch selection of the interactive lock element 406 displayed on the touchscreen display. In addition, task 310 can be associated with the detection of a registered fingerprint (any finger, including a thumb) on the touchscreen display or on a fingerprint scanner of the host device. In certain embodiments, the presence of the registered fingerprint is detected overlying the interactive lock element 406 displayed on the touchscreen display. In such embodiments, the user may be required to press and hold a finger overlying the displayed interactive lock element 406 for a short period of time to allow the host device to read and validate the user's fingerprint. This safeguard is desirable to ensure that only authorized users can lock/unlock the touchscreen.

In addition to locking/disabling the touchscreen functionality, the host device may take further actions in response to the "activate lock" trigger event. For example, the process 300 may hide certain non-essential, unimportant, or irrelevant user interface items in response to detecting the occurrence of the "activate lock" trigger event (task 314). Thus, the media content continues playing in an uninterrupted manner, and the media player controls 408, the progress bar 410, and the play head 412 can be hidden while the touchscreen remains locked. As another example, the process 300 may change the appearance or status of the interactive lock element 406 in response to detecting the occurrence of the "activate lock" trigger event (task 316). In this regard, the appearance of the interactive lock element 406 can be updated to indicate the locked status.

Figure 6:
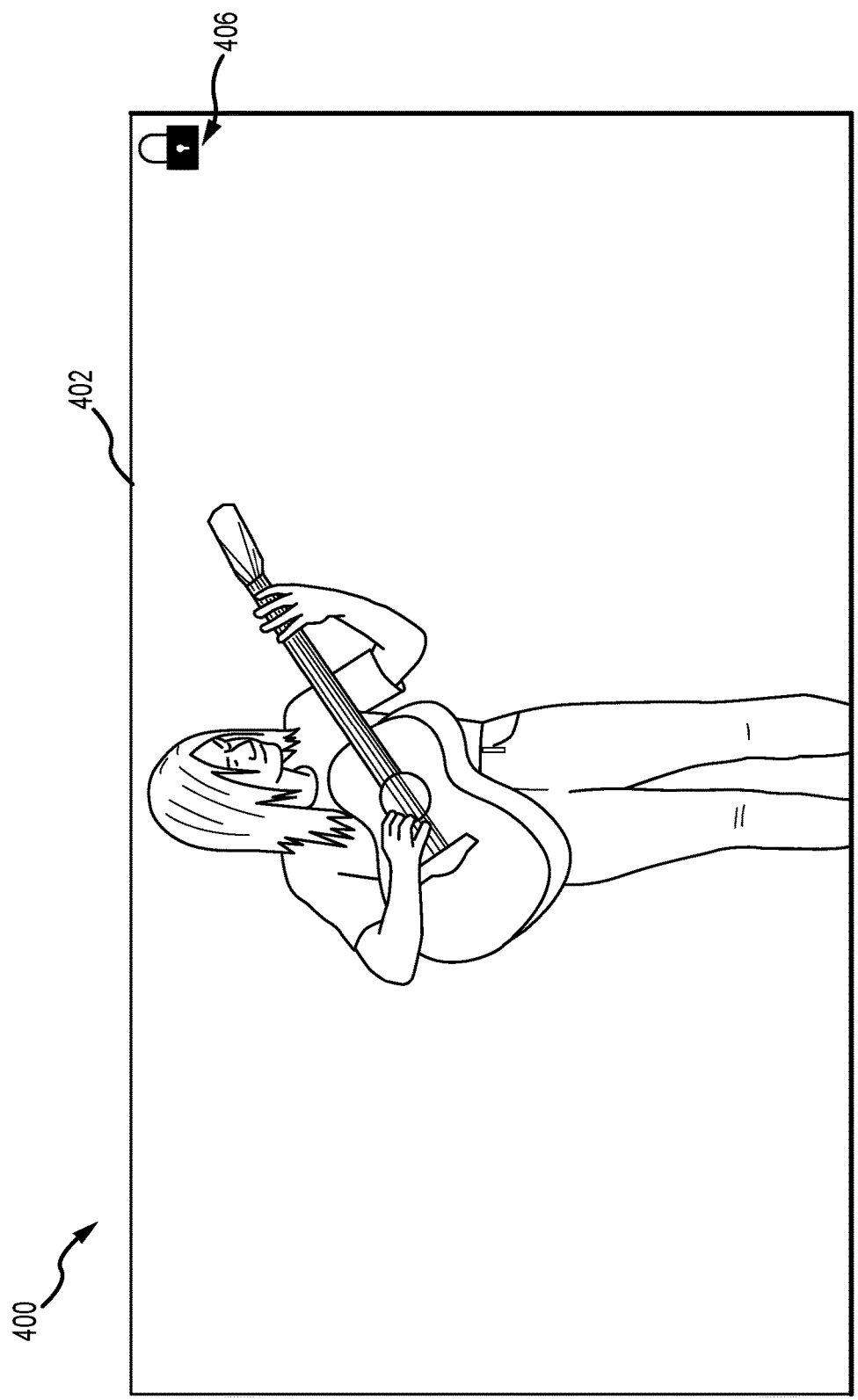
FIG. 6 is a screen shot of the media player shown in FIG. 4, as captured with the interactive lock element displayed in a locked state.

FIG. 6 is a screen shot of the media player 400, as captured with the interactive lock element 406 displayed in a locked state. FIG. 6 shows the state of the media player after detection of an "activate lock" event, which results in the removal of non-essential graphical elements, locking/disabling of the touchscreen display, and display of the locked version of the interactive lock element 406. In certain embodiments, the interactive lock element 406 automatically disappears after a short period of time, e.g., a few seconds, five seconds, or the like. Thereafter, playback of the media content continues in a full screen mode with the touchscreen display locked or disabled. The locked status of the touchscreen display ensures that the media content plays without interruption or any distractions that might otherwise be caused by inadvertent contact with the touchscreen display.

Unlocking of the touchscreen display is achieved in a similar manner. To this end, the process 300 may continue until detection of another "display lock" trigger event (task 318), which causes the process 300 to control the display of the interactive lock element 406 once again (task 320). For this example, user interaction with the touchscreen display serves as the "display lock" trigger event, which results in the display of the interactive lock element 406 in its locked state. Playback of the media content continues, and non-essential elements remain hidden or deactivated.

This example assumes that some type of detectable event, user interaction, command, or state/status of the host device triggers the next activation of the interactive lock element 406. Accordingly, the process 300 detects the occurrence of an "unlock" trigger event (task 322) and, in response to detecting the occurrence of that trigger event, unlocks or enables the touchscreen functionality of the media player during playback of the media content (task 324). In certain embodiments, the "unlock" trigger event corresponds to some type of user interaction with the host device, including, without limitation: selecting the interactive lock element 406; physical contact with the touchscreen display (a simple touch, a designated tapping pattern, a designated swipe pattern, touching a designated area or zone of the touchscreen display, etc.); a voice command; movement of the host device (such as a designated type of shaking or motion); a detectable facial appearance; a detectable eye blinking pattern; and/or a biometric scan (such as a fingerprint scan, a retina or iris scan, a palm print or palm vein scan, etc.). In accordance with certain embodiments, the "unlock" trigger event corresponds to interaction with the displayed interactive lock element 406. Thus, if the user touches or taps on or near the displayed interactive lock element 406 (using a finger, a stylus, or any object that can serve as a touchscreen input device), the process 300 will respond by unlocking, enabling, or activating the touchscreen functionality (task 324).

In accordance with the exemplary embodiment described here, the user engages the interactive lock element 406 to change the functionality of the touchscreen display (locked/disabled versus unlocked/enabled). Thus, task 322 can be associated with the detection of a touch selection of the interactive lock element 406 while it is displayed in its locked state. In addition, task 322 can be associated with the detection of a registered fingerprint (any finger, including a thumb) on the touchscreen display or on a fingerprint scanner of the host device. In certain embodiments, the presence of the registered fingerprint is detected overlying the interactive lock element 406 displayed on the touchscreen display. In such embodiments, the user may be required to press and hold a finger overlying the displayed interactive lock element 406 for a short period of time to allow the host device to read and validate the user's fingerprint.

In addition to unlocking/enabling the touchscreen functionality, the host device may take further actions in response to the "unlock" trigger event. For example, the process 300 may unhide the previously hidden non-essential, unimportant, or irrelevant user interface items in response to detecting the occurrence of the "unlock" trigger event (task 326). Thus, the media content continues playing in an uninterrupted manner, and the media player controls 408, the progress bar 410, and the play head 412 can be displayed (temporarily or persistently) while the touchscreen remains unlocked. As another example, the process 300 may change the appearance or status of the interactive lock element 406 in response to detecting the occurrence of the "unlock" trigger event (task 328). In this regard, the appearance of the interactive lock element 406 can be updated to indicate the unlocked status (as depicted in FIG. 5).

The above description refers to certain trigger events that cause the display of the interactive lock element 406. In some implementations, the interactive lock element 406 (in its unlocked state) is automatically displayed by default whenever playback of media content begins, or whenever the Play button is activated. In such implementations, the interactive lock element 406 may be displayed for only a short period of time before it automatically disappears.

In accordance with certain embodiments, the interactive lock element 406 can be displayed and activated to lock the touchscreen display when media content playback is paused, when media content playback is stopped, and/or before media content playback begins. In such embodiments, the user can initiate locking of the touchscreen display at a time when the media content is not playing, but the locking or disabling of the touchscreen display is delayed until after playback actually begins.

In accordance with some embodiments, the touchscreen display is automatically unlocked (without any user involvement or interaction) in response to various events, conditions, or device status. For example, the touchscreen display can be automatically unlocked when playback of the media content ends. As another example, the touchscreen display can be automatically unlocked if a commercial break, an advertisement, or other type of interstitial content is detected during playback of the media content. As another example, the touchscreen display can be automatically unlocked if the host device receives an incoming call, if one or more designated applications generates a notification or message, or the like.

The touchscreen locking methodology described here is not limited or restricted to media player applications. Indeed, touchscreen locking methodology can also be utilized with other applications, software components, and devices if so desired. For example, touchscreen locking can be implemented with any of the following applications, without limitation: a music player; a geographical navigation system; a presentation (slideshow) application; a photo or video editing application; a video game system.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of controlling touch sensitivity of a touchscreen display of an electronic device during playback of media content, the method comprising:
   controlling display of a media player on the touchscreen display to playback a media program in conjunction with one or more control elements;
   in response to a first trigger event applied by a user of the electronic device during playback of the media program, controlling display of an interactive lock element on the touchscreen display;
   detecting occurrence of an activate lock trigger event when the user of the electronic device interacts with the interactive lock element of the touchscreen display;
   in response to detecting the occurrence of the activate lock trigger event, locking at least some touchscreen functionality of the media player and hiding at least some of the one or more control elements while continuing playback of the media program and otherwise ceasing the display of the interactive lock element on the touchscreen display;
   in response to a subsequent detection of another occurrence of the first trigger event while the at least some touchscreen functionality is locked, once again controlling the display of the interactive lock element on the touchscreen display;
   detecting an occurrence of a deactivate lock trigger event when the user of the electronic device interacts with the interactive lock element on the touchscreen display; and
   in response to detecting the occurrence of the deactivate lock trigger event, unlocking the at least some touchscreen functionality of the media player.

2. The method of claim 1, further comprising:
   changing an appearance of the interactive lock element from an unlocked appearance to a locked appearance in response to detecting the occurrence of the activate lock trigger event.

3. The method of claim 2 wherein the detecting the occurrence of the activate lock trigger event and the detecting of the occurrence of the deactivate lock trigger event both comprise:
   detecting touch selection of the interactive lock element displayed on the touchscreen display.

4. The method of claim 2 wherein the detecting the occurrence of the activate lock trigger event and the detecting of the occurrence of the deactivate lock trigger event both comprise:
   detecting presence of a registered fingerprint on the interactive lock element displayed on the touchscreen display.

5. The method of claim 4, wherein the first trigger event is an application of a finger touch to the touchscreen during playback of the media program.

6. An electronic device comprising:
   a touchscreen display;
   at least one processor; and
   at least one memory storage device having computer executable instructions stored therein that, when executed, configure the processor to control display of a media player on the touchscreen display to:
     playback a media program in conjunction with one or more control elements;
     control display of an interactive lock element on the touchscreen display in response to a first trigger event applied by a user of the electronic device during playback of the media program;
     detect an occurrence of an activate lock trigger event when the user of the electronic device interacts with the interactive lock element of the touchscreen display;
     in response to detecting the occurrence of the activate lock trigger event, lock at least some touchscreen functionality of the media player and hiding at least some of the one or more control elements while continuing playback of the media program and otherwise cease the display of the interactive lock element on the touchscreen display;
     once again control the display of the interactive lock element on the touchscreen display in response to a subsequent detection of another occurrence of the first trigger event while the at least some touchscreen functionality is locked;
     detect an occurrence of a deactivate lock trigger event when the user of the electronic device interacts with the interactive lock element on the touchscreen display; and
     in response to detecting the occurrence of the deactivate lock trigger event, unlock the at least some touchscreen functionality.

7. The electronic device of claim 6, wherein detecting the occurrence of the activate lock trigger event comprises:
   detecting presence of a registered fingerprint on the touchscreen display.

8. The electronic device of claim 6, wherein the processor is further configured to:
   after locking the at least some of the touchscreen functionality, detect an occurrence of an unlock trigger event when the user of the electronic device subsequently interacts with the interactive lock element of the touchscreen display; and
   in response to detecting the occurrence of the unlock trigger event, unlock the disabled touchscreen functionality of the media player.

9. The electronic device of claim 8, wherein detecting the occurrence of the unlock trigger event comprises:
   detecting touch selection of the interactive lock element displayed on the touchscreen display.

10. The electronic device of claim 8, wherein detecting the occurrence of the unlock trigger event comprises:

detecting presence of a registered fingerprint on the touchscreen display.

11. A non-transitory machine-readable storage medium having executable instructions stored thereon, the instructions configurable to cause at least one processor to perform operations comprising:
- controlling display of a media player on a touchscreen display of an electronic device to playback a media program in conjunction with one or more control elements;
- in response to a first trigger event applied by a user of the electronic device during playback of the media program, controlling display of an interactive lock element on the touchscreen display;
- detecting an occurrence of an activate lock trigger event when the user of the electronic device interacts with the interactive lock element of the touchscreen display;
- in response to detecting the occurrence of the activate lock trigger event, locking at least some touchscreen functionality of the media player and hiding at least some of the one or more control elements while continuing playback of the media program and otherwise ceasing the display of the interactive lock element on the touchscreen display;
- in response to a subsequent detection of another occurrence of the first trigger event while the at least some touchscreen functionality is locked, once again controlling the display of the interactive lock element on the touchscreen display;
- detecting an occurrence of a deactivate lock trigger event when the user of the electronic device interacts with the interactive lock element on the touchscreen display; and
- in response to detecting the occurrence of the deactivate lock trigger event, unlocking the at least some touchscreen functionality of the media player.

12. The storage medium of claim 11, wherein detecting occurrence of the activate lock trigger event comprises:
- detecting presence of a registered fingerprint on the touchscreen display.

13. The storage medium of claim 11, wherein the operations performed by the at least one processor further comprise:
- after locking the at least some of the touchscreen functionality, detect an occurrence of an unlock trigger event when the user of the electronic device subsequently interacts with the interactive lock element of the touchscreen display; and
- in response to detecting the occurrence of the unlock trigger event, unlock the disabled touchscreen functionality of the media player.

14. The storage medium of claim 13, wherein detecting occurrence of the unlock trigger event comprises:
- detecting presence of a registered fingerprint on the touchscreen display.

* * * * *